(12) United States Patent
Chen et al.

(10) Patent No.: US 10,957,222 B2
(45) Date of Patent: Mar. 23, 2021

(54) NORMAL FAULT SIMULATION EXPERIMENT DEVICE WITH ADJUSTABLE ANGLE AND FRACTURE INITIATION POSITION AND METHOD OF USING THE SAME

(71) Applicant: SHANDONG UNIVERSITY OF SCIENCE AND TECHNOLOGY, Qingdao (CN)

(72) Inventors: Shaojie Chen, Qingdao (CN); Zhiyuan Li, Qingdao (CN); Xinyuan Zhang, Qingdao (CN); Zhiguo Xia, Qingdao (CN); Tianqi Jiang, Qingdao (CN); Jian Cui, Qingdao (CN); Dawei Yin, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 16/756,294

(22) PCT Filed: Apr. 29, 2019

(86) PCT No.: PCT/CN2019/084937
§ 371 (c)(1),
(2) Date: Apr. 15, 2020

(87) PCT Pub. No.: WO2020/209760
PCT Pub. Date: Oct. 15, 2020

(65) Prior Publication Data
US 2021/0049933 A1 Feb. 18, 2021

(30) Foreign Application Priority Data
Apr. 8, 2019 (CN) .......................... 201910274047.X

(51) Int. Cl.
*G06F 17/50* (2006.01)
*G09B 23/40* (2006.01)

(52) U.S. Cl.
CPC .................................. *G09B 23/40* (2013.01)

(58) Field of Classification Search
CPC ....................................................... G09B 23/40
(Continued)

(56) References Cited

U.S. PATENT DOCUMENTS

2009/0173148 A1* 7/2009 Jensen .................... F03D 17/00
73/116.03
2018/0132626 A1* 5/2018 He .......................... A47C 17/17

OTHER PUBLICATIONS

International Search Report issued in corresponding International Application No. PCT/CN2019/084937, dated Jan. 10, 2020, The State Intellectual Property Office of the P.R. China, Beijing, China.
(Continued)

*Primary Examiner* — Andre Pierre Louis
(74) *Attorney, Agent, or Firm* — Hauptman Ham, LLP

(57) ABSTRACT

Provided are a normal fault simulation experiment device with an adjustable angle and an adjustable fracture initiation position and a method of using the same, which relate to the technical field of normal fault simulation experiments. The device includes a base, a column, a baffle plate, a hydraulic lifting apparatus, a lower angle adjusting apparatus, a push rod apparatus, an upper loading apparatus, an upper angle adjusting apparatus, a front baffle plate and a transparent side plate. The hydraulic lifting apparatus and the lower angle adjusting apparatus are disposed below an experimental body, the upper loading apparatus and the upper angle adjusting apparatus are disposed above the experimental body, the transparent side plate is disposed on a rear side surface of the experimental body, and a plurality of strip-shaped front baffle plates are disposed on a front side surface of the experimental body. When a normal fault is simulated
(Continued)

by using the device, an inclined plate of the lower angle adjusting apparatus and an inclined push plate of the upper angle adjusting apparatus are at the same inclination angle, and the upper loading apparatus loads downward to form the normal fault. The technical problems that a non-practical mechanical formation mechanism is formed due to a single condition during simulation of the normal fault and the dip angle and the fracture initiation position of the fault are inconveniently adjusted are solved, bringing simple operation.

7 Claims, 2 Drawing Sheets

(58) Field of Classification Search
USPC .................................. 434/299; 703/6, 13
See application file for complete search history.

(56) References Cited

OTHER PUBLICATIONS

Written Opinion issued in corresponding International Application No. PCT/CN2019/084937, dated Jan. 10, 2019, The State Intellectual Property Office of the P.R. China, Beijing, China.
Chinese Search Report issued in corresponding Chinese Patent Application No. 201910274047X, dated Aug. 23, 2019.
First Office Action issued in corresponding Chinese Patent Application No. 201910274047X, dated Sep. 2, 2019.
Notification to Grant Patent Right for Invention issued in corresponding Chinese Patent Application No. 201910274047X, dated Nov. 18, 2019.

* cited by examiner

NORMAL FAULT SIMULATION EXPERIMENT DEVICE WITH ADJUSTABLE ANGLE AND FRACTURE INITIATION POSITION AND METHOD OF USING THE SAME

RELATED APPLICATIONS

The present application is a National Phase of International Application Number PCT/CN2019/084937, filed Apr. 29, 2019, and claims the priority of Chinese Application No. 201910274047X, filed Apr. 8, 2019.

TECHNICAL FIELD

The present disclosure relates to the technical field of similar material simulation experiments, and in particular to a normal fault simulation experiment device with an adjustable angle and an adjustable fracture initiation position and a method of using the same.

BACKGROUND

Tectonophysical simulation experiment is an important and effective method of studying geological structure as well as an important approach for geological workers to study a stratum deformation process and a fault formation mechanism. An existing method of making a fault by using a simulation experiment device does not conform to a fault formation mechanism of the geological structure, and there is no method for flexibly controlling the position and the angle of the fault formation. Therefore, a device and a method for conveniently controlling a dip angle and a position of a simulation fault are needed.

At present, Chinese patent 2018102561390 discloses a device of simulating a ground fracture propagation and a method of using the same to solve problems such as a single basement movement type, an unchangeable movement dip angle and a significant boundary effect in a general simulation experiment. However, the entire structure is too complex with excessively high cost, a movable baffle plate is used to eliminate boundary effect, and a fault plane is produced artificially rather than in a stress environment, which is not compliant with actual formation situation of a fault.

Chinese patent 2010102463419 discloses a simulation experiment push plate for simulating a fault in a geological structure, that is, an experimental device for simulating fault formation and development processes by performing stress loading for an experimental material. The experimental device includes a bench seat and a bench surface, and further includes a model loading area, and power loading mechanism and is provided with a peripheral frame. The model loading area is formed by an upper combined push plate, a lower combined push plate, a left side plate, a right side plate, and the like. The power loading mechanism includes a power unit including a manual power loading apparatus. The power unit includes an electric cylinder and its supporting rollers, and the apparatus is provided with a detachable combined push plate with a guiding chute. The device is provided with a movable side plate mechanism and a triangular splicing module. The triangular splicing module includes a left part and a right part, where each part is provided with a dovetail groove and a rectangular groove, and a guiding contact surface is movably connected through an inclined surface between the two parts. With the above structure, geological simulations of a single fault and a combined fault may be achieved, loading simulation of a geological stress such as squeezing, stretching and bending and twisting may be achieved for the experimental material with certain plasticity, and the power combined push plates may be arbitrarily spliced in a building-block form. Therefore, the entire structure is simple, and the movement is flexible. The device includes the triangular splicing module connected with the push plate through the dovetail groove and the rectangular groove. However, only two modules are disposed to simulate the single fault. For a complex fault zone simulation, a plurality of experiments are required to achieve a desired purpose. Further, the final simulation accuracy is not satisfactory due to a large theoretical error, even resulting in inability to evaluate the actual situations. In addition, with the combined push plate and so on, the entire structure is excessively complex, resulting in too high experimental costs.

Chinese patent 201710153425X discloses an experimental device for simulating normal and reverse fault movements of a rock-soil body and a method thereof. According to the device and the method, a dislocation dip angle of a fault may be arbitrarily adjusted within a range of 30-90 degrees, and a door hole is opened on a side wall of a model box to facilitate removing the soil body so as to simulate deformation and damage of the overlying soil body resulting from dislocated movement of the normal and reverse faults. However, it does not conform to a mechanical mechanism of fault formation, and a fracture initiation position of the fault cannot be adjusted, which are also the problems of the experimental device.

To reduce the experimental costs, it is required to fabricate a fault simulation experiment device which is simple in structure, conforms to a mechanical mechanism of fault formation, and convenient to operate.

SUMMARY

To solve the technical problems of inconvenient adjustments of a dip angle and a fracture initiation position of a fault during normal fault formation and to enable the simulation of normal fault formation to be more in line with a mechanical formation mechanism, a specific technical solution is described below.

A normal fault simulation experiment device with an adjustable angle and an adjustable fracture initiation position includes a base, a column, a top beam, a baffle plate, a hydraulic lifting apparatus, a lower angle adjusting apparatus, a push rod apparatus, an upper loading apparatus, an upper angle adjusting apparatus, a positioning apparatus, a front baffle plate and a transparent side plate. The columns are disposed at both ends of the base, the baffle plates are further disposed on the base between the columns, upper ends of the columns are connected through the top beam, and an experimental body is placed between the baffle plates; an end of the push rod apparatus is fixed onto the column; the hydraulic lifting apparatus and the lower angle adjusting apparatus are disposed below the experimental body; the upper loading apparatus and the upper angle adjusting apparatus are disposed above the experimental body; the positioning apparatus is disposed on the upper angle adjusting apparatus and the lower angle adjusting apparatus respectively; the transparent side plate is fixedly disposed on a rear side surface of the experimental body, and a plurality of strip-shaped front baffle plates are disposed on a front side surface of the experimental body.

Preferably, the lower angle adjusting apparatus includes an inclined plate, a telescoping rod, an angle meter and a lower baffle plate. A lower part of the lower baffle plate is connected with the push rod apparatus, the inclined plate is hinged with an end of the lower baffle plate, and both ends of the telescoping rod are hinged with the inclined plate and the lower baffle plate respectively.

More preferably, the angle meter is disposed at the hinging position of the lower baffle plate and the inclined plate, and a pull-type telescoping plate is disposed at the hinging position of the inclined plate.

Preferably, the hydraulic lifting apparatus includes a sliding block, a hydraulic cylinder, a pulley, a locking screw and a sliding baffle plate. A pulley groove is disposed on a lower surface of the sliding baffle plate, the pulley slides along the pulley groove, the pulley is fixed at both ends of a pressure head of the hydraulic cylinder respectively, a dovetail groove on the sliding block is matched with a sliding rail on the base, the locking screw is disposed on the sliding block, and the hydraulic cylinder is fixed above the sliding block.

Preferably, the upper angle adjusting apparatus includes a pressurizing plate, an inclined push plate, an upper baffle plate, an angle adjusting push rod and a telescoping push rod. A rib plate is disposed at an end of the pressurizing plate, a pulley is disposed at an end of the rib plate and pressed on the inclined push plate, the angle adjusting push rod is disposed between the upper baffle plate and the inclined push plate to adjust an inclination angle of the inclined push plate, an end of the telescoping push rod is fixed to the baffle plate, and the other end is connected with the upper baffle plate.

More preferably, a lead screw adjustment mechanism is adopted for the angle adjusting push rod and the telescoping push rod; the telescoping push rod adopts a hydraulic telescoping cylinder; the push rod apparatus adopts a hydraulic telescoping cylinder, and an end of the hydraulic telescoping cylinder is fixedly connected with the lower baffle plate; an angle meter is disposed at a hinging position of the inclined push plate and the upper baffle plate.

Preferably, the positioning apparatus includes a laser and a positioner, the laser is disposed on the inclined plate in parallel to the inclined plate, and the positioner is disposed on the inclined push plate in parallel to the inclined push plate.

Preferably, the front baffle plate and the transparent side plate are made of a transparent material, and the inclined plate and the inclined push plate are made of a polytetrafluoroethylene material.

A method of using a normal fault simulation experiment device with an adjustable angle and an adjustable fracture initiation position is provided. The steps of performing the method with the above normal fault simulation experiment device with an adjustable angle and an adjustable fracture initiation position are described below.

At step A, the push rod apparatus pushes an end of the lower baffle plate to move to a fracture initiation position, and the hydraulic lifting apparatus adjusts a position and a height of the hydraulic cylinder to lift the sliding baffle plate to be flush and in contact with the lower baffle plate, where a contact point is a lower fracture initiation point of a normal fault.

At step B, an angle between the inclined plate and the lower baffle plate is adjusted to be complementary to a dip angle of the fault, and a size of the included angle is determined through an angle meter.

At step C, baffle plates on both ends are fixed and the transparent side plate on the rear side surface of the experimental body is fixed at the same time, and the experimental body and the front baffle plate are laid layer by layer.

At step D, the upper angle adjusting apparatus is installed and an included angle between the inclined push plate and the upper baffle plate made to be equal to the dip angle of the fault by adjusting the angle adjusting push rod, and a size of the included angle is determined through the angle meter.

At step E, the laser of the positioning apparatus is turned on, and a position of the upper baffle plate is determined by adjusting the telescoping of the telescoping push rod to adjust the inclined plate and the inclined push plate to be in a same plane, where a contact position of the upper baffle plate and a pressurizing plate is an upper fracture initiation point of the normal fault.

At step F, the positions of the upper loading apparatus and the hydraulic lifting apparatus are adjusted, and a formation process of a normal fault with a determined angle and a determined fracture initiation position is simulated by loading of the upper loading apparatus.

The beneficial effects of the present disclosure are described below.

(1) With the normal fault simulation experiment device with an adjustable angle and an adjustable fracture initiation position according to the present disclosure, the dip angle of the fault is determined jointly by combining the lower angle adjusting apparatus with the upper angle adjusting apparatus so as to realize control for the dip angle of the fault, and the pull-type telescoping plate is disposed at the hinging position of the inclined plate to further ensure the fracture initiation position of the fault; control of the fracture initiation position is realized by performing loading through cooperation of the push rod apparatus, the upper loading apparatus and the hydraulic lifting apparatus, thereby solving a problem that the fault simulation device initiates fracture at a single position.

(2) The device forms the dip angle by combination of the inclined plate and the lower baffle plate so as to ensure that the fault is fractured at the preset dip angle at the fracture initiation point, and the angle meter is disposed at the hinging position of the lower baffle plate and the inclined plate to ensure the accuracy of the dip angle of the fault; the pull-type telescoping plate is disposed at the hinging position of the inclined plate to perform reverse stretching, thereby further ensuring the accuracy of the fracture initiation point of the fault; the hydraulic lifting apparatus is provided with the sliding block and the pulley to facilitate movement of the hydraulic lifting apparatus, and further, the hydraulic lifting apparatus is fixed by disposing the locking screw; the upper angle adjusting apparatus applies a pressure along the inclined push plate through the pulley on the rib plate to initiate fracture at the connection position of the inclined push plate and the pressurizing plate; the laser and the positioner of the positioning apparatus ensure that the inclined plate and the inclined push plate are in the same plane, that is, the plane where the normal fault is located.

(3) According to the method of using the device, the dip angle of the simulation fault can be realized. Thus, the flexile control of the dip angle of the fault is achieved, the experimental cost is reduced, and the experimental operation steps are simplified; the hydraulic lifting apparatus ensures control of the deformation of similar materials after the fault structure is formed.

Numerals of the drawings are described as follows: 1—a base, 2—a column, 3—a top beam, 4—a baffle plate, 5—a hydraulic lifting apparatus, 51—a sliding block, 52—a hydraulic cylinder, 53—a pulley, 54—a locking screw, 55—a sliding baffle plate, 6—a lower angle adjusting apparatus, 61—an inclined plate, 62—a telescoping rod, 63—an angle meter, 64—a lower baffle plate, 7—a push rod apparatus, 8—an upper loading apparatus, 9—an upper angle adjusting apparatus, 91—a pressurizing plate, 92—an inclined push plate, 93—an upper baffle plate, 94—an angle adjusting push rod, 95—a telescoping push rod, 10—a positioning apparatus, 11—a front baffle plate, 12—a transparent side plate, and 13—an experimental body.

DETAILED DESCRIPTION OF THE EMBODIMENTS

Figure 1:
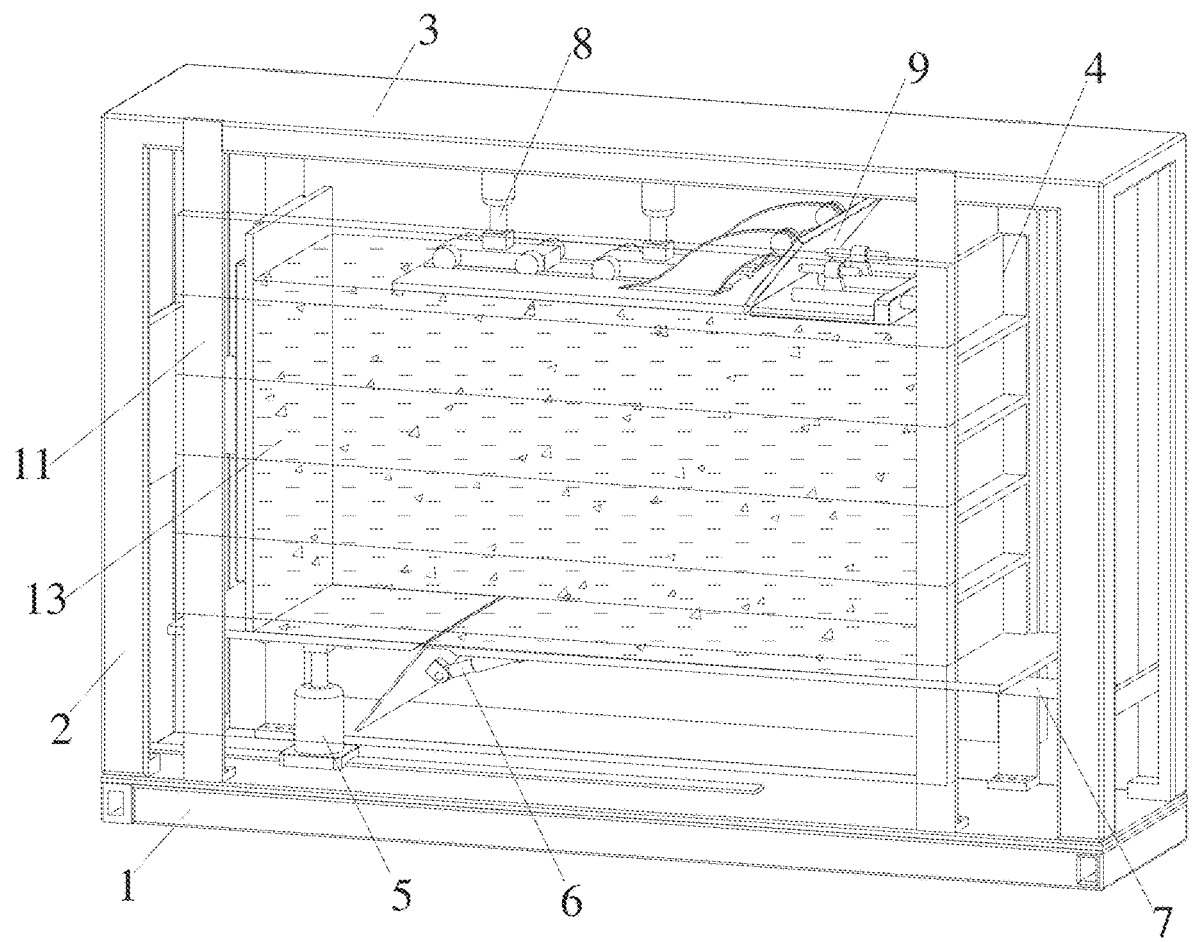
FIG. 1 is a schematic diagram illustrating a structure of a normal fault simulation experiment device with an adjustable angle and an adjustable fracture initiation position according to an example of the present disclosure.
Figure 2:
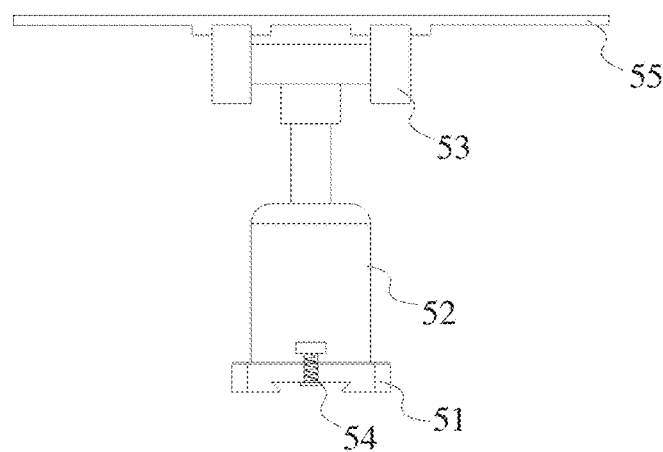
FIG. 2 is a schematic diagram illustrating a structure of a hydraulic lifting apparatus according to an example of the present disclosure.
Figure 3:
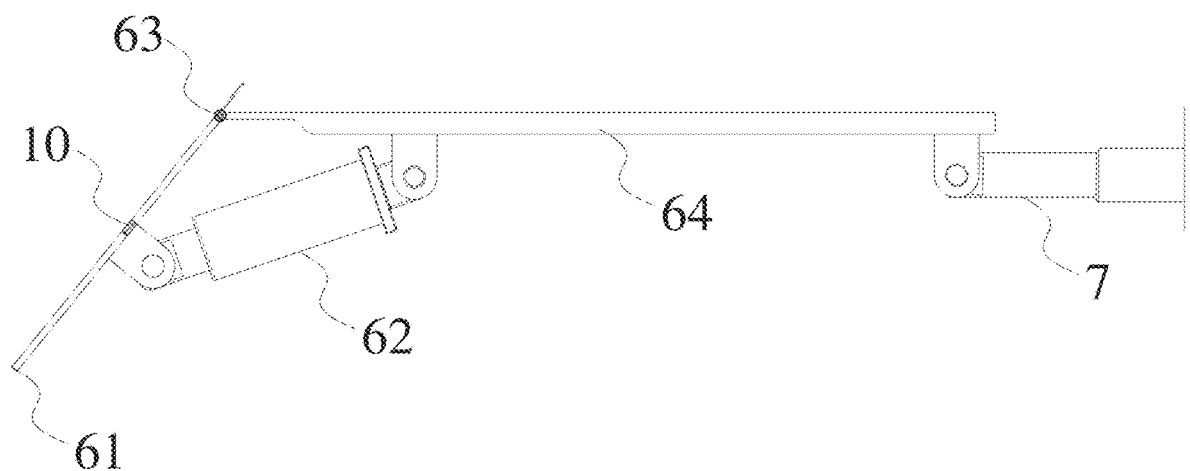
FIG. 3 is a schematic diagram illustrating a structure of a lower angle adjusting apparatus according to an example of the present disclosure.
Figure 4:
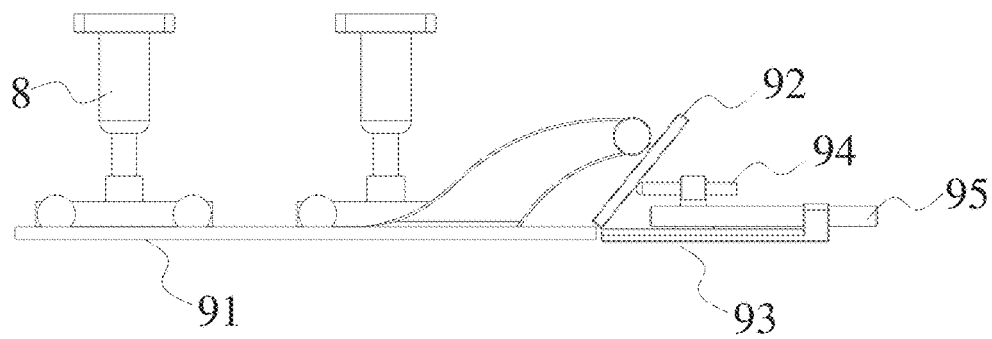
FIG. 4 is a schematic diagram illustrating a structure of an upper angle adjusting apparatus according to an example of the present disclosure.
Figure 5:
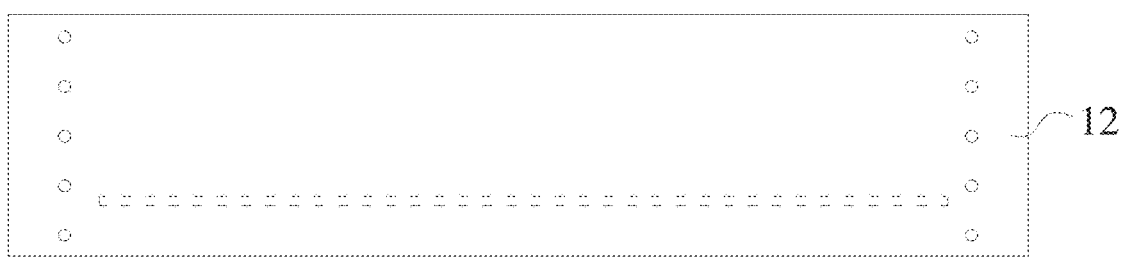
FIG. 5 is a schematic diagram illustrating a structure of a transparent side plate according to an example of the present disclosure.

As shown in FIGS. 1-5, specific examples of a normal fault simulation experiment device with an adjustable angle and an adjustable fracture initiation position and a method of using the same according to the present disclosure are described below.

Specifically, a normal fault simulation experiment device with an adjustable angle and an adjustable fracture initiation position includes a base 1, a column 2, a top beam 3, a baffle plate 4, a hydraulic lifting apparatus 5, a lower angle adjusting apparatus 6, a push rod apparatus 7, an upper loading apparatus 8, an upper angle adjusting apparatus 9, a positioning apparatus 10, a front baffle plate 11 and a transparent side plate 12. The combination of the base 1, the column 2, the top beam 3 and the baffle plate 4 forms a frame of the experiment device for placing and fixing an experimental body 13. The hydraulic lifting apparatus 5 cooperates with the deformation of the experimental body 13 generated in a fault formation process through ascent and descent; the lower angle adjusting apparatus 6 and the upper angle adjusting apparatus 9 determine a dip angle of a fault through the positioning apparatus and an angle meter 63 within the apparatus; the push rod apparatus 7 controls a lower fracture initiation point of the normal fault and a position of the overall fault by adjusting the position of the lower angle adjusting apparatus; the upper angle adjusting apparatus 9 adjusts its position along with the lower angle adjusting apparatus, thereby ensuring the accuracies of the dip angle and the position of the fault; the upper loading apparatus 8 applies a load to simulate fault formation; the disposal of the front baffle plate 11 and the transparent side plate 12 can facilitate observing the fault formation process. In addition, the device also solves a problem that the fault simulation device initiates fracture at a single position.

The columns 2 are disposed at both ends of the base 1, the baffle plates 4 are also disposed on the base between the columns 2, upper ends of the columns 2 are connected through the top beam 3, and the experimental body 13 is placed between the baffle plates. One end of the push rod apparatus 7 is fixed on the column 2, and the other end is connected with the lower angle adjusting apparatus 6 to adjust the position of the lower angle adjusting apparatus 6. The hydraulic lifting apparatus 5 and the lower angle adjusting apparatus 6 are disposed below the experimental body 13, the upper loading apparatus 8 and the upper angle adjusting apparatus 9 are disposed above the experimental body 13, and the positioning apparatus is disposed on the upper angle adjusting apparatus 9 and the lower angle adjusting apparatus 6 respectively. The transparent side plate 12 is fixedly disposed on a rear side surface of the experimental body through bolts, and a plurality of strip-shaped front baffle plates 11 are disposed on a front side surface of the experimental body 13 through bolts.

Specifically, the lower angle adjusting apparatus 6 includes an inclined plate 61, a telescoping rod 62, an angle meter 63 and a lower baffle plate 64. A lower part of the lower baffle plate 64 is connected with the push rod apparatus 7, the push rod apparatus 7 pushes the lower baffle plate 64 to move horizontally along a groove on the transparent side plate 12, the inclined plate 61 is hinged with an end of the lower baffle plate 64, both ends of the telescoping rod 62 are hinged with the inclined plate 61 and the lower baffle plate 64 respectively, and the telescoping rod 62 adjusts an angle between the inclined plate 61 and the lower baffle plate 64 by telescoping. The angle meter 63 is disposed at a hinging position of the lower baffle plate 64 and the inclined plate 61 to ensure the angle between the inclined plate 61 and the lower baffle plate 64. When the angle is a designed angle, the telescoping rod is fixed to maintain the designed angle. A pull-type telescoping plate is disposed at the hinging position of the inclined plate 61, so that the inclined plate 61 may be extended 3-5 centimeters reversely toward the above of the lower baffle plate to be inserted into the experimental body 13 in advance. Therefore, the accuracy of the fracture initiation position is further ensured.

The hydraulic lifting apparatus 5 includes a sliding block 51, a hydraulic cylinder 52, a pulley 53, a locking screw 54 and a sliding baffle plate 55. A pulley groove is disposed on a lower surface of the sliding baffle plate 55, the pulley 53 slides along the pulley groove, the pulley 53 is fixed at both ends of a pressure head of the hydraulic cylinder respectively, a dovetail groove on the sliding block 51 is matched with a sliding rail on the base 1, the locking screw 54 is disposed in the sliding block 51, and the hydraulic cylinder 52 is fixed above the sliding block 51. During use, the sliding baffle plate 55 may be changed according to the position of the fracture initiation point of the fault, and the positions of the hydraulic cylinder 52 and the sliding block 51 are determined according to a length of the sliding baffle plate 55. Generally, the hydraulic cylinder 52 is placed at a middle position of the sliding baffle plate 55. When the sliding baffle plate 55 is long, two hydraulic cylinders 52 may also be disposed at both sides of the sliding baffle plate 55 respectively and fixed by the locking screws 54.

Specifically, the upper angle adjusting apparatus 9 includes a pressurizing plate 91, an inclined push plate 92, an upper baffle plate 93, an angle adjusting push rod 94 and a telescoping push rod 95. A rib plate is disposed at an end of the pressurizing plate 91, a pulley is disposed at an end of the rib plate and pressed onto the inclined push plate 92, the upper loading apparatus 8 applies a pressure on the inclined push plate 92 through the pulley during loading. At the same time, the pressurizing plate 91 and the upper baffle plate 93 generate relative movement after the fault is fractured and deformed, thereby ensuring a smooth transition of a pressurizing movement. The angle adjusting push rod 94, which specifically is a lead screw structure, is disposed between the upper baffle plate 93 and the inclined push plate 92 to control a telescoping length of the angle adjusting push rod 94 by adjusting the lead screw, thereby changing an inclination angle of the inclined push plate 92. One end of the telescoping push rod 95 is fixed onto the baffle plate, and the other end is connected with the upper baffle plate 93. The angle meter 63 is disposed at a connection position of the upper baffle plate 93 and the inclined push plate 92 to ensure the angle between the upper baffle plate 93 and the inclined push plate 92, thereby ensuring an accuracy of setting the dip angle of the fault of the experimental body.

Specifically, the positioning apparatus 10 includes a laser and a positioner. The laser is disposed on the inclined plate in parallel to the inclined plate, and the positioner is disposed on the inclined push plate in parallel to the inclined push plate. During use, when the laser is turned on to irradiate laser light to the center of the positioner, it indicates that the inclined plate and the inclined push plate are in the same plane. Further, the positions of the laser and the positioner can be interchanged. The laser and the positioner are easily installed to perform accurate positioning.

A lead screw adjustment mechanism may be adopted for the above angle adjusting push rod 94 and telescoping push rod 95; a hydraulic telescoping cylinder may be adopted for the telescoping rod 62 in the lower angle adjusting apparatus; a hydraulic telescoping cylinder may also be adopted for the push rod apparatus 7, and an end of the hydraulic telescoping cylinder is fixedly connected with the lower baffle plate. In addition, the front baffle plate 11 and the transparent side plate 12 are made of a transparent material to facilitate observing a fault formation process, and the inclined plate 61 and the inclined push plate 92 are made of a polytetrafluoroethylene material.

The present device forms the dip angle by combination of the inclined plate and the lower baffle plate so as to ensure that the fault is fractured at the preset dip angle at the fracture initiation point, and the angle meter is disposed at the hinging position of the lower baffle plate and the inclined plate to ensure the accuracy of the dip angle of the fault; the pull-type telescoping plate is disposed at the hinging position of the inclined plate perform reverse stretching, thereby further ensuring the accuracy of the fracture initiation point of the fault; the hydraulic lifting apparatus is provided with the sliding block and the pulley to facilitate movement of the hydraulic lifting apparatus, and further the hydraulic lifting apparatus is fixed by disposing the locking screw; the upper angle adjusting apparatus applies a pressure along the inclined push plate through the pulley on the rib plate to initiate fracture at the connection position of the inclined push plate and the pressurizing plate; the laser and the positioner of the positioning apparatus ensure that the inclined plate and the inclined push plate are in the same plane, that is, the plane where the normal fault is located.

A method of using a normal fault simulation experiment device with an adjustable angle and an adjustable fracture initiation position is provided. The steps of performing the method with the normal fault simulation experiment device with an adjustable angle and an adjustable fracture initiation position are described below.

At step A, the push rod apparatus pushes an end of the lower baffle plate to move to a fracture initiation position, and the hydraulic lifting apparatus adjusts a position and a height of the hydraulic cylinder of the hydraulic lifting apparatus to lift the sliding baffle plate to be flush and in contact with the lower baffle plate, where a contact point is a lower fracture initiation point of a normal fault.

At step B, an angle between the inclined plate and the lower baffle plate is adjusted to be complementary to a dip angle of the fault, a size of the included angle is determined through an angle meter, and the angle is fixed by fixing a length of a telescoping rod.

At step C, baffle plates at both ends of the experiment device are fixed, the transparent side plate on a rear side surface of the experimental body is fixed, at the same time, the experimental body and the front baffle plate are laid layer by layer, and the transparent side plate and the front baffle plate are fixed through bolts.

At step D, the upper angle adjusting apparatus is installed and an included angle between the inclined push plate and the upper baffle plate made equal to the dip angle of the fault by adjusting the angle adjusting push rod, and a size of the included angle is determined through the angle meter.

At step E, the laser of a positioning apparatus is turned on, and the position of the upper baffle plate is determined by adjusting the telescoping of the telescoping push rod to adjust the inclined plate and the inclined push plate to be in a same plane, where a contact position of the upper baffle plate and a pressurizing plate is an upper fracture initiation point of the normal fault.

At step F, the positions of the upper loading apparatus and the hydraulic lifting apparatus are adjusted, and a formation process of a normal fault with the determined angle and the determined fracture initiation position is simulated by loading of the upper loading apparatus.

According to the method, the control of the dip angle of the simulation fault is realized. The flexile control of the dip angle of the fault is achieved, the experimental cost is reduced, and the experimental operation steps are simplified; the hydraulic lifting apparatus ensures control of the deformation of similar materials after the fault structure is formed.

Of course, the above descriptions are not intended to limit the present disclosure, and the present disclosure is also not limited to the above examples. Changes, modifications, additions or substitutions made by persons skilled in the art within the essence of the present disclosure shall also be encompassed in the scope of protection of the present disclosure.

The invention claimed is:

1. A normal fault simulation experiment device with an adjustable angle and an adjustable fracture initiation position, comprising:
 a base, a plurality of columns, a top beam, a plurality baffle plates, a hydraulic lifting apparatus, a lower angle adjusting apparatus, a push rod apparatus, an upper loading apparatus, an upper angle adjusting apparatus, a positioning apparatus, a front baffle plate and a transparent side plate, wherein,
 the plurality of columns are disposed at both ends of the base, baffle plates of the plurality of baffle plates are further disposed on the base between the plurality of columns, upper ends of the plurality of columns is connected through the top beam, and an experimental body is placed between the plurality of baffle plates; one end of the push rod apparatus is fixed on a column of the plurality of columns;
 the hydraulic lifting apparatus and the lower angle adjusting apparatus are disposed below the experimental body; the upper loading apparatus and the upper angle adjusting apparatus are disposed above the experimental body; the positioning apparatus is disposed on the upper angle adjusting apparatus and the lower angle adjusting apparatus respectively;

the transparent side plate is fixedly disposed on a rear side surface of the experimental body, and a plurality of strip-shaped front baffle plates are disposed on a front side surface of the experimental body;

the lower angle adjusting apparatus comprises an inclined plate, a telescoping rod, an angle meter and a lower baffle plate, a lower part of the lower baffle plate is connected with the push rod apparatus, the inclined plate is hinged with an end of the lower baffle plate, and both ends of the telescoping rod are hinged with the inclined plate and the lower baffle plate respectively;

the upper angle adjusting apparatus comprises a pressurizing plate, an inclined push plate, an upper baffle plate, an angle adjusting push rod and a telescoping push rod, a rib plate is disposed at an end of the pressurizing plate, a pulley is disposed at an end of the rib plate and pressed on the inclined push plate, the angle adjusting push rod is disposed between the upper baffle plate and the inclined push plate to adjust an inclination angle of the inclined push plate, one end of the telescoping push rod is fixed on the lower baffle plate, and the other end is connected with the upper baffle plate.

2. The normal fault simulation experiment device with an adjustable angle and an adjustable fracture initiation position according to claim 1, wherein the angle meter is disposed at a hinging position of the lower baffle plate and the inclined plate, and a pull-type telescoping plate is disposed at the hinging position of the inclined plate.

3. The normal fault simulation experiment device with an adjustable angle and an adjustable fracture initiation position according to claim 1, wherein the hydraulic lifting apparatus comprises a sliding block, a hydraulic cylinder, a pulley, a locking screw and a sliding baffle plate, a pulley groove is disposed at a lower surface of the sliding baffle plate, the pulley slides along the pulley groove, the pulley is fixed at both ends of a pressure head of the hydraulic cylinder respectively, a dovetail groove on the sliding block is matched with a sliding rail on the base, the locking screw is disposed on the sliding block, and the hydraulic cylinder is fixed above the sliding block.

4. The normal fault simulation experiment device with an adjustable angle and an adjustable fracture initiation position according to claim 1, wherein a lead screw adjustment mechanism is adopted for the angle adjusting push rod and the telescoping push rod; a hydraulic telescoping cylinder is adopted for the telescoping push rod; a hydraulic telescoping cylinder is further adopted for the push rod apparatus, and an end of the hydraulic telescoping cylinder is fixedly connected with the lower baffle plate; the angle meter is disposed at a hinging position of the inclined push plate and the upper baffle plate.

5. The normal fault simulation experiment device with an adjustable angle and an adjustable fracture initiation position according to claim 1, wherein the positioning apparatus comprises a laser and a positioner, the laser is disposed on the inclined plate in parallel to the inclined plate, and the positioner is disposed on the inclined push plate in parallel to the inclined push plate.

6. The normal fault simulation experiment device with an adjustable angle and an adjustable fracture initiation position according to claim 1, wherein the front baffle plate and the transparent side plate are made of a transparent material, and the inclined plate and the inclined push plate are made of a polytetrafluoroethylene material.

7. A method of using the normal fault simulation experiment device with an adjustable angle and an adjustable fracture initiation position according to claim 1, comprising the following steps:

at step A, pushing, by the push rod apparatus, an end of the lower baffle plate to move to a fracture initiation position, and adjusting, by the hydraulic lifting apparatus, a position and a height of a hydraulic cylinder of the hydraulic lifting apparatus to lift a sliding baffle plate to be flush and in contact with the lower baffle plate, wherein a contact point is a lower fracture initiation point of a normal fault;

at step B, adjusting an angle between the inclined plate and the lower baffle plate to be complementary to a dip angle of the fault, and determining a size of the included angle through an angle meter;

at step C, fixing baffle plates at both ends, and fixing the transparent side plate on a rear side surface of the experimental body, and laying the experimental body and the front baffle plate layer by layer;

at step D, installing the upper angle adjusting apparatus and making an included angle between the inclined push plate and the upper baffle plate equal to the dip angle of the fault by adjusting the angle adjusting push rod, and determining a size of the included angle through the angle meter;

at step E, turning on the laser of the positioning apparatus, and determining a position of the upper baffle plate through telescoping of the telescoping push rod to adjust the inclined plate and the inclined push plate to be in a same plane, wherein a contact position of the upper baffle plate and a pressurizing plate is an upper fracture initiation point of the normal fault; and at step F, adjusting the positions of the upper loading apparatus and the hydraulic lifting apparatus, and simulating a formation process of the normal fault with the determined angle and the determined fracture initiation position by loading of the upper loading apparatus.

\* \* \* \* \*